United States Patent
Sutcliffe et al.

[19]

[11] Patent Number: 6,058,367
[45] Date of Patent: May 2, 2000

[54] SYSTEM FOR MATCHING USERS BASED UPON RESPONSES TO SENSORY STIMULI

[75] Inventors: Andrew B. Sutcliffe, Tyngsboro; Kevin A. Dunn, Boston, both of Mass.

[73] Assignee: Tele-Publishing, Inc., Boston, Mass.

[21] Appl. No.: 08/876,006

[22] Filed: Jun. 13, 1997

[51] Int. Cl.[7] .................. G06F 17/60; G09B 7/00
[52] U.S. Cl. ................. 705/1; 434/323; 434/324
[58] Field of Search .................. 706/11; 705/1, 705/26, 27; 434/323, 324, 236, 238

[56] References Cited

U.S. PATENT DOCUMENTS

| | | | |
|---|---|---|---|
| Re. 30,579 | 4/1981 | Goldman et al. | 340/149 R |
| Re. 30,580 | 4/1981 | Goldman et al. | 340/149 R |
| 4,608,601 | 8/1986 | Shreck et al. | 348/473 |
| 4,651,150 | 3/1987 | Katz et al. | 340/825.34 |
| 4,739,322 | 4/1988 | Katz et al. | 340/825.34 |
| 4,792,968 | 12/1988 | Katz | 379/92 |
| 4,816,824 | 3/1989 | Katz et al. | 340/825.34 |
| 4,845,739 | 7/1989 | Katz | 379/92 |
| 4,870,579 | 9/1989 | Hey | 705/27 |
| 4,930,150 | 5/1990 | Katz | 379/93 |
| 4,932,046 | 6/1990 | Katz et al. | 379/32 |
| 4,939,773 | 7/1990 | Katz | 379/204 |
| 4,987,590 | 1/1991 | Katz | 379/204 |
| 4,996,642 | 2/1991 | Hey | 705/27 |
| 5,014,298 | 5/1991 | Katz | 379/93 |
| 5,016,270 | 5/1991 | Katz | 379/92 |
| 5,048,075 | 9/1991 | Katz | 379/92 |
| 5,073,929 | 12/1991 | Katz | 379/93 |
| 5,086,394 | 2/1992 | Shapira | 705/1 |
| 5,091,933 | 2/1992 | Katz | 379/204 |
| 5,109,404 | 4/1992 | Katz et al. | 379/88 |
| 5,128,984 | 7/1992 | Katz | 379/92 |
| 5,136,501 | 8/1992 | Silverman et al. | 705/37 |
| 5,185,787 | 2/1993 | Katz | 379/204 |
| 5,218,535 | 6/1993 | Pietrowski | 434/323 |
| 5,218,631 | 6/1993 | Katz | 379/88 |
| 5,224,153 | 6/1993 | Katz | 379/93 |
| 5,251,252 | 10/1993 | Katz | 379/92 |
| 5,255,309 | 10/1993 | Katz | 379/88 |
| 5,259,023 | 11/1993 | Katz | 379/88 |
| 5,297,197 | 3/1994 | Katz | 379/204 |
| 5,349,633 | 9/1994 | Katz | 379/88 |
| 5,351,285 | 9/1994 | Katz | 379/94 |
| 5,359,645 | 10/1994 | Katz | 379/93 |
| 5,365,575 | 11/1994 | Katz | 379/92 |
| 5,412,708 | 5/1995 | Katz | 348/14 |
| 5,442,688 | 8/1995 | Katz | 379/156 |
| 5,495,284 | 2/1996 | Katz | 348/15 |

(List continued on next page.)

OTHER PUBLICATIONS

"WWW.match.com, Online Matchmaking", web site pages, 4 pages, printed out on Jun. 16, 1997 (origination date unknown).

Jones, R.; "Modern–Day Matchmaking Sophisticated Dating Services Cater to State's 1 Million Singles"; Rocky Mountain News; Thursday, Dec. 28, 1989, p. 48. Denver Rky Mtn News. Retrieved from Dialog Information Services, Acession No. 05044942.

Zelitchenko, A.; "Information Retrieval Expert System Matchmaker"; Computers in Human Behavior; vol. 8, No. 4, pp. 281–296, Dec. 1992.

"No 'Roomate Roulette' at Colleges"; PR Newswire Association Inc.; p. 2. PR Newswire. Retrieved from Dialog Information Services, Accession No. 0732883, Aug. 1994.

*Primary Examiner*—Eric W. Stamber
*Assistant Examiner*—Brian Sattizahn
*Attorney, Agent, or Firm*—Nutter, McClennen & Fish LLP

[57] ABSTRACT

A system for matching users in response to user selections from sets of sensory stimuli. The system provides a first sensory stimulus set to a user including a plurality of stimuli and stores an identifier that identifies the user's response to the stimulus. The system then generates a user data string that includes an identifier for each of the sensory stimuli selected by the user in each of the plurality of sensory stimulus sets and sums the number of sensory stimuli selected by a selected user and another user to provide a match value. The match value is compared to a predetermined threshold value.

16 Claims, 8 Drawing Sheets

U.S. PATENT DOCUMENTS

| | | | |
|---|---|---|---|
| 5,496,175 | 3/1996 | Oyama et al. | 434/118 |
| 5,542,849 | 8/1996 | Douglass | 434/236 |
| 5,551,880 | 9/1996 | Bonnstetter et al. | 434/236 |
| 5,553,120 | 9/1996 | Katz | 379/88 |
| 5,561,707 | 10/1996 | Katz | 379/88 |
| 5,681,046 | 10/1997 | Lawrence | 273/459 |
| 5,696,981 | 12/1997 | Shovers | 704/10 |
| 5,775,695 | 7/1998 | Byers | 273/161 |
| 5,796,945 | 8/1998 | Tarabella | 395/200.49 |
| 5,878,416 | 3/1999 | Harris et al. | 707/10 |
| 5,911,581 | 6/1999 | Reynolds et al. | 434/236 |
| 5,920,845 | 7/1999 | Risemberg | 705/1 |
| 5,950,200 | 9/1999 | Sudai et al. | 707/9 |
| 5,954,581 | 9/1999 | Ohta et al. | 463/9 |
| 5,963,951 | 10/1999 | Collins | 707/102 |

SYSTEM FOR MATCHING USERS BASED UPON RESPONSES TO SENSORY STIMULI

GOVERNMENT RIGHTS

Not Applicable

RELATED APPLICATIONS

Not applicable.

FIELD OF THE INVENTION

This invention relates generally to matching techniques and more particularly to a method and apparatus for heuristic matching.

BACKGROUND OF THE INVENTION

As is known in the art, human tastes are subjective in that each person has their own tastes based, at least in part, upon their own personal experiences and feelings accumulated over a period of time. Thus, an item which pleases or which would be selected by one individual will not necessarily please or be selected by another individual. Due to the subjective nature of individual tastes, it is relatively difficult to recommend or match items to a particular person based on information indicating individual likes and dislikes.

As is also known, one particular type of matching occurs when people seek to meet other people to enter into a particular type of relationship or to engage in a particular type of activity. For example, one person may be seeking another person as a pen pal with whom they can correspond, or as an activity partner with whom they can engage in social or athletic activities. Alternatively, one person may be seeking another person with whom an intimate relationship may be formed. Thus, people seeking other people to form particular types of relationships or to engage in certain activities is a particular type of matching problem.

One technique which has been used to aid in forming such relationships is to place an advertisement in a newspaper, magazine, brochure, pamphlet or the like. Such advertisements are typically referred to as "personals advertisements", "personals ads" or more simply as "personals." Many newspapers, for example, include a section identified as a personals section. Thus, people who would like to meet other people with similar likes and interests place personal advertisements in newspapers or other forms of print media.

To identify persons with similar interests, prior art techniques require people to answer a series of questions. Such questions may be presented to people in the form of a written question questionnaire which includes instructions directing the person answering the questions to provide information about themselves including their likes and dislikes with respect to certain topics. Such questionnaires also instruct people to rate or grade certain activities, thoughts, items, or personal characteristics or traits. The answers to the questions are used to define the users' tastes.

One problem with such a question-and-answer approach is that users tend to spend a great deal of time trying to select what they may perceive to be the "correct" or "best" answer. This results in a time consuming process which typically does not provide an accurate indication of the person's tastes. Consequently, when the information is used to match persons, the persons tend to be relatively poorly matched. Thus, when two people who have been matched using such a question-and-answer technique meet, the results are sometimes not what was expected or hoped for by the two people.

Similar problems in expectations and results arise when trying to recommend or match to a particular person an item such as a consumer product, a service or an entertainment event. In this case, people answer a series of questions about a particular product or rate a particular product in accordance with a particular rating scale. The ratings are used in mathematical computations to determine the mathematical probability that a person would like a particular item.

Due to the popularity of personals advertisements in newspapers and other print media and the increasing popularity of the Internet and the Internet's World-Wide Web there has been a trend to provide personals advertisement systems on computer systems and in particular on networked computer systems. Such personals systems are typically made available to the public through computer programs used to locate resources on the World Wide Web generally referred to as Web browsers.

Matching systems utilized in such personals systems, however, typically utilize the above-described question and answer technique to match people seeking similar types of relationships or items. The matching systems included in personals systems available on computer networks are time consuming for the user and provide relatively poor match results.

It would therefore be desirable to provide a matching system which can be used to recommend or match people seeking particular types of relationships or which can be used to recommend or match a person to a particular consumer product, service or entertainment event. It would also be desirable to provide a system to recommend an item to a particular individual based upon the individual's responses to a series of stimuli. It would also be desirable to provide a matching technique which utilizes acquires intuitive information from a user based upon the user's selection of particular stimuli from a plurality of stimuli and which utilizes the subjective nature of an individuals tastes. It would also be desirable to provide a matching system which does not require a user to rate particular items or to answer particular questions.

SUMMARY OF THE INVENTION

In accordance with the present invention, a matching system includes presentation means to present to a user a plurality of sensory stimulus sets each of which includes a plurality of stimuli, storing means to store an identifier which identifies a sensory stimulus selected by the user, a data string generator to generate a user data string for each of a plurality of users with each user data string including identifiers each of which corresponds to one of the sensory stimuli selected by the user from each of the plurality of sensory stimulus sets, a counter to count the number of like sensory stimuli chosen by a selected user and another user and to provide a match value and a comparison means to compare the match value to a predetermined threshold value. With this particular arrangement, a matching system which acquires intuitive information about a user based upon their choice of particular stimuli from each of the sensory stimulus sets is provided. The stimuli may be provided as a series of images, sounds, simulated situations, multimedia stimulus or other stimulus which excites at least one of the human senses (e.g. sight, sound, touch, taste or smell). For example, a live person could communicate with the user, perhaps pretending to be a rude waiter and scaring the user. Thus, in one embodiment for example, the user is presented with a series of visual stimuli such as multiple images. In this case, the presentation means simultaneously displays multiple images on a display screen. The simultaneously displayed multiple images form an image set. The user selects one image from the images. Such selection may be made utilizing a graphical user interface (GUI) of a personal computer for example. The matching system then displays a next image set. The user again selects one image from the image set. This sequence continues until the user has selected one image from a each of a series of image sets which have been displayed to the user. In a preferred embodiment, the images are selected such that the images in any particular image set contrast with each other. For example, one image set may include a pair of images. A first image of the pair of images may correspond to an image of an elegant dinner and a second image of the pair of images may correspond to an image of a casual dinner. The image of the elegant dinner represents a formal activity as contrasted with the image of the casual dinner which represents an informal activity. In some embodiments, the image pairs may be presented in a particular sequence. It is preferable that each image in the image pair be presented with equal dignity. For example, the images should preferably be provided having equivalent sizes and shapes, and the use of color versus black and white images should be carefully selected so as not to predispose a user to select one image over another. A user selects one of the first and second images of the pair of images. The system records the particular selections made by the user in a user data string. The system further includes a means for storing each user data string in a table. The counting means utilizes the user data strings in the table to determine the number of identical sensory stimuli chosen by a selected user and each of the other users having a user data string stored in the table. The counting means also provides a match value and determines if the match value is greater than the threshold value. If the match value is greater than the predetermined threshold value, the user is added to a list of users possibly compatible to the selected user. Thus, the matching system provides a match list to a selected user. The match list may contain a list of items which may be of interest to the user. In one embodiment, the list of items may correspond to a list of user names. The user names in the match list correspond to users who have responded to the stimuli in the same or a similar manner as the selected user. In other embodiments, the match list may contain a list of consumer products, services or entertainment events.

Each of the different types of stimuli may be said to form one of a plurality of possible paths which the user may select and traverse. For example, a first sequence of image pairs can represent a first image path, while a second sequence of different image pairs can represent a second image path. Similarly, a sequence of audio signal pairs represents an audio path, etc. . . . The user may thus select one or more paths from a plurality of possible paths. In this case, the system may further include means for selecting a first path from a plurality of paths the user has chosen and means for identifying all other users who followed the selected path. In this manner, user choices made from the same possible choices may be compared.

In accordance with a further aspect of the present invention, a computer implemented method of matching includes the steps of (a) providing a first sensory stimulus set to a first user, the first sensory stimulus set including a plurality of stimuli, (b) in response to the first user selecting one sensory stimuli from the plurality of sensory stimuli, storing an identifier which identifies the sensory stimuli selected by the first user, (c) repeating steps (a) and (b) for a plurality of sensory stimulus sets and (d) generating a first user data string which includes an identifier for each of the sensory stimuli selected by the first user in each of the plurality of sensory stimulus sets. With this particular arrangement, a matching method is provided. By presenting a sensory stimulus to a user and recording the user's response to the stimuli, the method acquires intuitive information from the user. The user's responses may be recorded in the form of a user data string. Such intuitive information may be recorded from a plurality of different users and an individual user data string is generated for each of the users. The selections of stimuli by one user may be compared with the selection of stimuli by other users and a list of users who have selected a threshold number of like stimuli may be generated. The list may be further filtered by applying user profile criteria to the user data strings. The user profile criteria may correspond to particular user preferences or characteristics such as age, gender, religion, location, ethnicticity, physical characteristics, marital status, allergies, pets, ownership of certain items (e.g. a stereo) etc . . .

In accordance with a still further aspect of the present invention, a computer program product includes a computer useable medium having computer readable program code to provide a first sensory stimulus set to a first user, the first sensory stimulus set including a plurality of stimuli, a computer useable medium having computer readable program code to store an identifier which identifies a sensory stimulus selected from the plurality of sensory stimuli provided to the first user, and a computer useable medium having computer readable program code to generate a first user data string which includes an identifier for each of the sensory stimuli selected by the first user in each of the plurality of sensory stimulus sets. With this particular arrangement, a computer program product which implements a matching function is provided. The first sensory stimulus set may be presented to a plurality of different users to generate a plurality of user data strings. In one embodiment, the computer program product further includes computer readable program code to store the plurality of user data strings in a table and computer readable program code to select one of the plurality of user data strings from the table and compare the selected user data string to the each of the other user data strings in the table. The computer readable program code determines which of the other user data strings already stored in the table most closely match the selected user data string and generates a list of matches. The determination of which user data strings most closely match the selected user data string may be made in a accordance with a predetermined matching criteria. The computer program product may further include computer readable program code which applies profile criteria to the user data strings. Such user profile criteria may correspond to particular user preferences or characteristics such as age, gender, etc . . . and may be applied to the data strings either prior to or after the match list is generated.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

The following description sets forth an exemplary embodiment, in accordance with the present invention, of a matching system for matching or providing a recommendation of an item to a user based upon that user's selection of sensory stimuli compared with a the selection of sensory stimuli of other users.

Before describing the matching system and techniques of the present invention, it should be appreciated that, in an effort to promote clarity, reference is sometimes made herein to matching which takes place in particular applications such as matching people seeking other people to engage in particular activities or relationships. Such matching is described herein as being accomplished with the use of particular sensory stimuli such as images. Such reference to particular matching applications (i.e. people seeking other people) or to particular sensory stimuli (i.e. images) should not be taken as limiting the applicability of the present invention to any particular matching application or sensory stimuli. Rather, as mentioned above, the present invention finds application in a wide variety of applications in which matching systems may be useful or desired. Accordingly, those of ordinary skill in the art will appreciate that the description provided herein of processing taking place on images could equally be taking place on sounds, smells, or other sensory stimuli to which a person may respond.

For purposes of only illustration and not intended in any way to limit the scope of the present invention, the matching system and associated methods are described herein in the context of a selected user seeking to identify one or more persons with whom they can engage in a particular activity or with whom they can enter into a desired relationship. As mentioned above, those of ordinary skill in the art will understand that the matching system is not limited to generating lists of persons who may be compatible for particular activities or relationships. Rather, the matching system of the present invention can be used to recommend or match to a particular user a variety of items including products or services.

Figure 1:
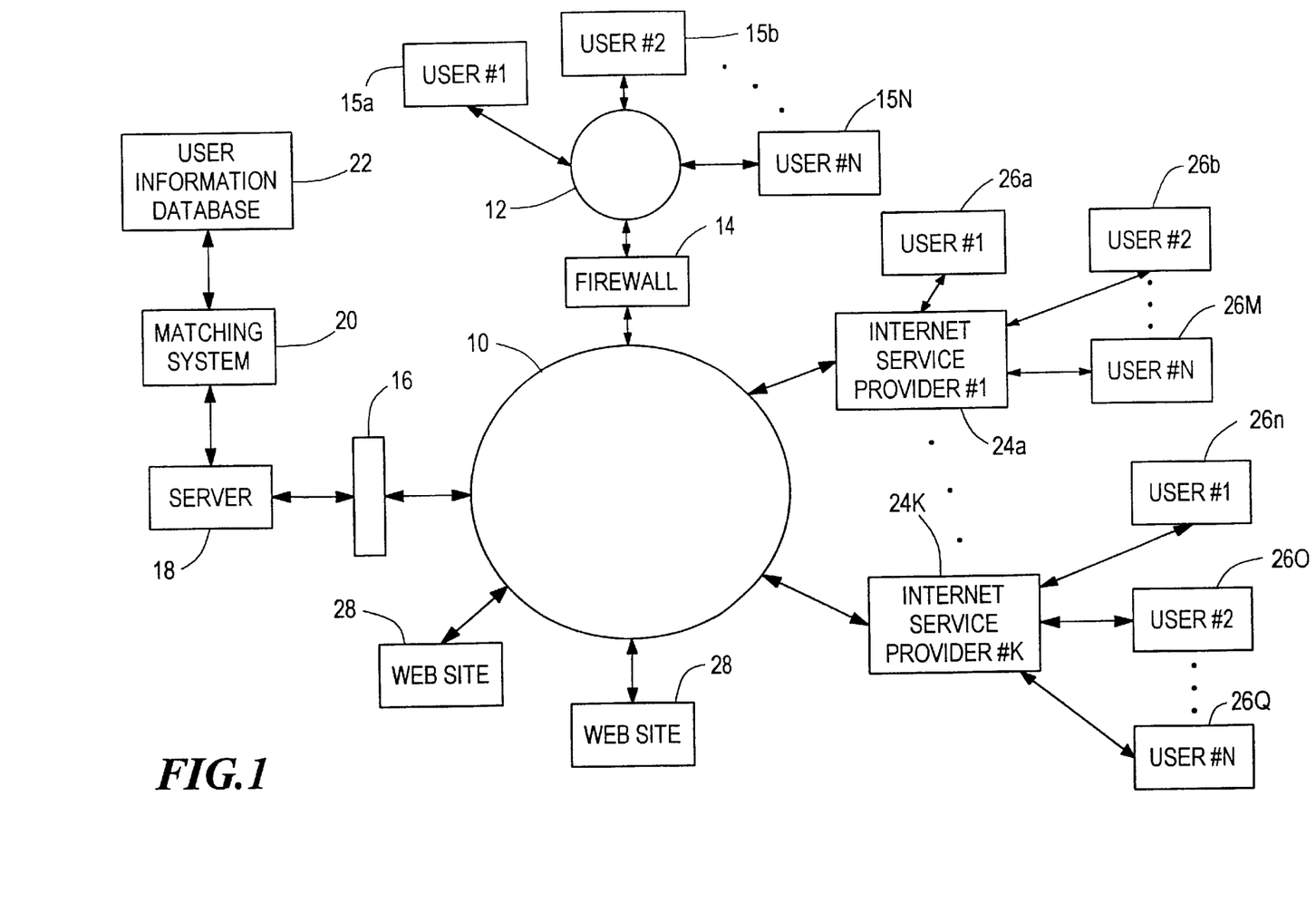
FIG. 1 is a block diagram of a system in which the matching technique of the present invention may be utilized.

Referring now to FIG. 1, a public network or Internet 10 is coupled to a private network 12 through a firewall server 14. Coupled to private network 12 are a plurality of users 15a–15N generally denoted 15. As used herein, the term "internet" generally refers to any collection of distinct networks working together to appear as a single network to a user. The term "Internet", on the other hand, refers to the so-called world wide "network of networks" that are connected to each other using the Internet protocol (IP) and other similar protocols. The Internet provides file transfer, remote log in, electronic mail, news and other services.

As described herein, the exemplary public network of FIG. 1 is for descriptive purposes only. Although the description may refer to terms commonly used in describing particular public networks such as the Internet, the description and concepts equally apply to other public and private computer networks, including systems having architectures dissimilar to that shown in FIG. 1.

One of the unique aspects of the Internet system is that messages and data are transmitted through the use of data packets referred to as "datagrams." In a data gram based network, messages are sent from a source to a destination in a manner similar to a government mail system. For example, a source computer may send a data gram packet to a destination computer regardless of whether or not the destination computer is currently powered on and coupled to the network. The Internet protocol (IP) is completely sessionless, such that IP data gram packets are not associated with one another.

The firewall server 14 is a computer which couples the computers of a private network or server e.g. network 12 to the Internet 10. Firewall server 14 may thus act as a gatekeeper for messages and data grams going to and from the Internet 10.

Also coupled to Internet 10 through a second firewall server 16 is a server 18. Server 18 has coupled thereto a matching system 20 and a user information database 22. Server 18 allows properly authorized users to access matching system 20. The function of matching system 20 will be described in detail herein below. Suffice it here to say, however, that matching system 20 receives requests from users and in response to such requests provides a list of recommended items to a user.

Internet service providers 24a–K are also coupled to the Internet 10. A service provider is an organization that provides connections to a part of the Internet. A first Internet service provider 24a includes a processor which couples a plurality of users 26a–26M to the Internet 10. Thus, users 26a–26M are coupled to the Internet through Internet service provider 24a. A further Internet service provider 24K couples a further plurality of users 26n–Q to the Internet 10. Also coupled to the Internet 10 are a plurality of web sites or nodes 28. When one of the users 15a–N, 26a–M, 26n–Q wishes to conduct a transaction at one of the nodes 28, the user accesses the node 28 through the Internet 10.

Each node in the system shown in FIG. 1 is configured to understand which firewall and node to send data packets to given a destination IP address. This may be implemented by providing the firewalls and nodes with a map of all valid IP addresses disposed on its particular private network or another location on the Internet 10. The map may be in the form of prefix matches up to and including the full IP address.

User information can be stored in database 22. The information need only be stored once. The information may be stored, for example, as a record or as a file. The information for each particular user is stored in a particular data structure in database 22.

Database 22 and matching system 20 may be provided, for example, as an object-oriented database management system (DBMS), a relational database management system (e.g. DB2, SQL, etc.) or another conventional database package. Thus, the database 22 can be implemented using object-oriented technology or via text files.

FIGS. 2, 2A, 4 and 4A are a series of flow diagrams showing the processing performed by matching system 20 (FIG. 1) to generate a match list in response to a user request. The rectangular elements (typified by element 29 in FIG. 2), herein denoted "processing blocks," represent computer software instructions or groups of instructions. The diamond shaped elements (typified by element 34 in FIG. 2), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Figure 2:
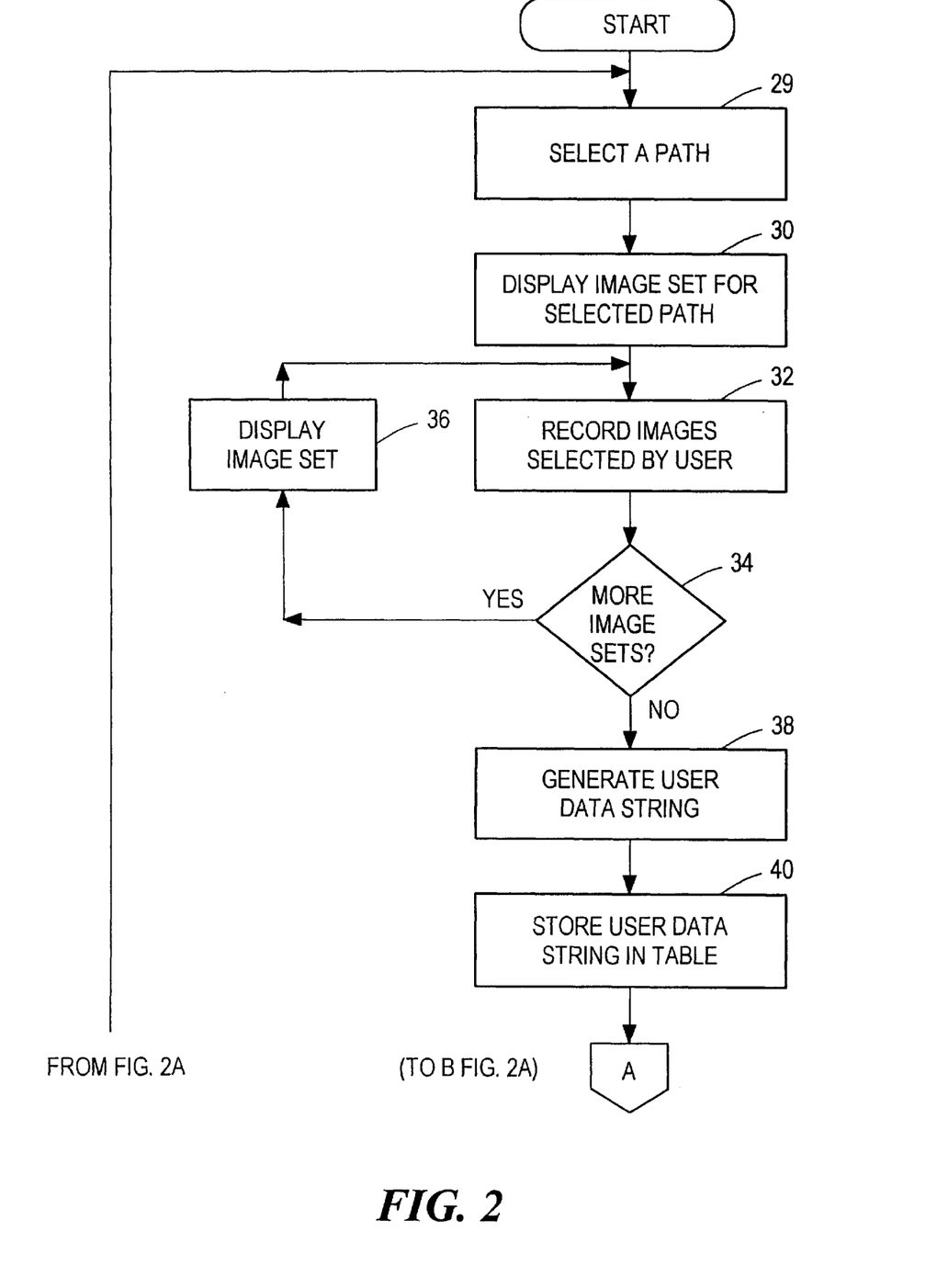
FIGS. 2 and 2A are a series of flow diagrams illustrating a first set of processing steps which take place to generate a match list.
Figure 2A:
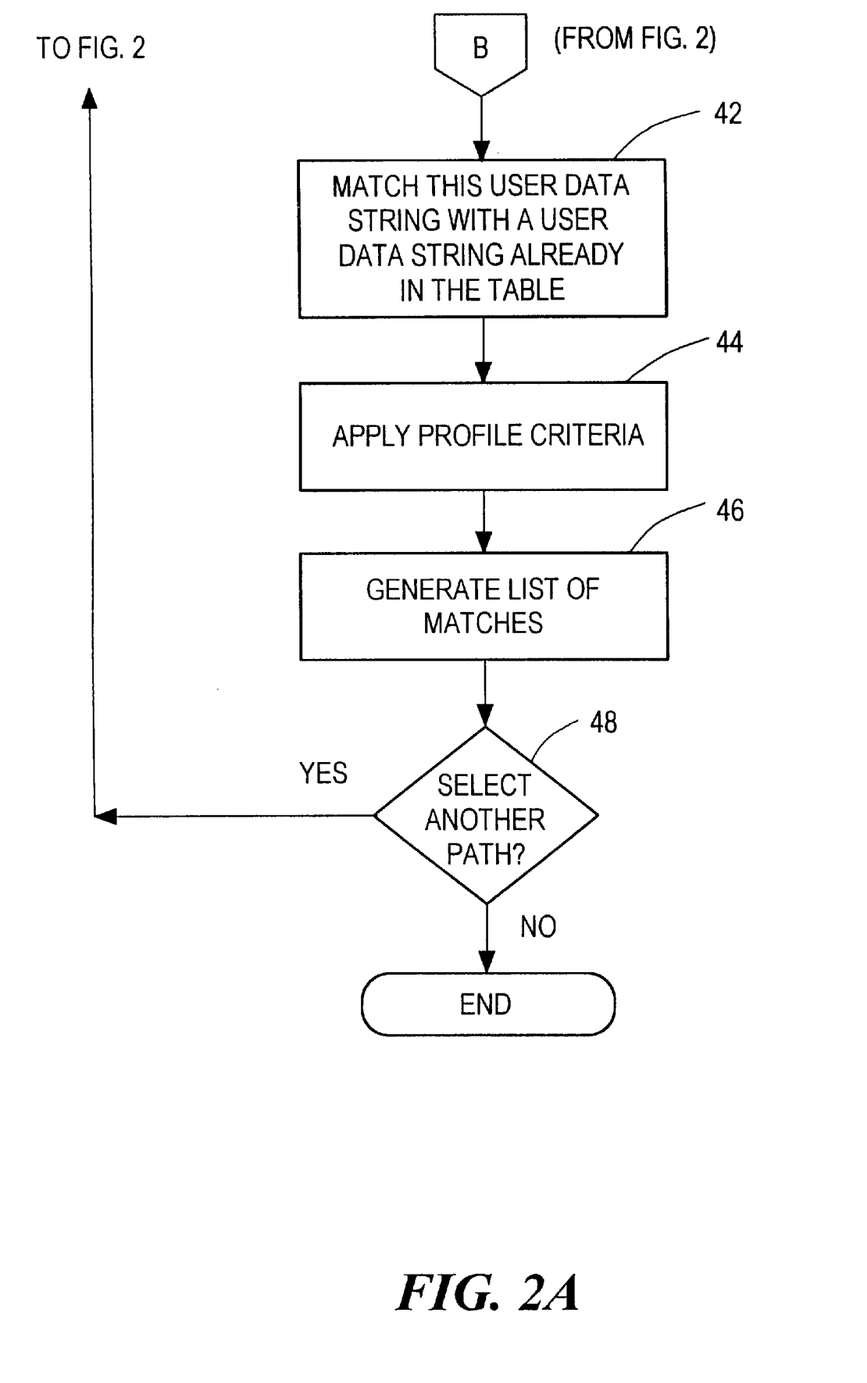

Turning now to FIG. 2, processing begins in step 29 in which a user selects a particular path from a plurality of possible paths. After a particular path is selected, processing proceeds to processing step 30 where the matching system displays an image set included within the user selected path. The term path as used herein refers to an image or other sensory sequence presented to a user.

Figure 3:
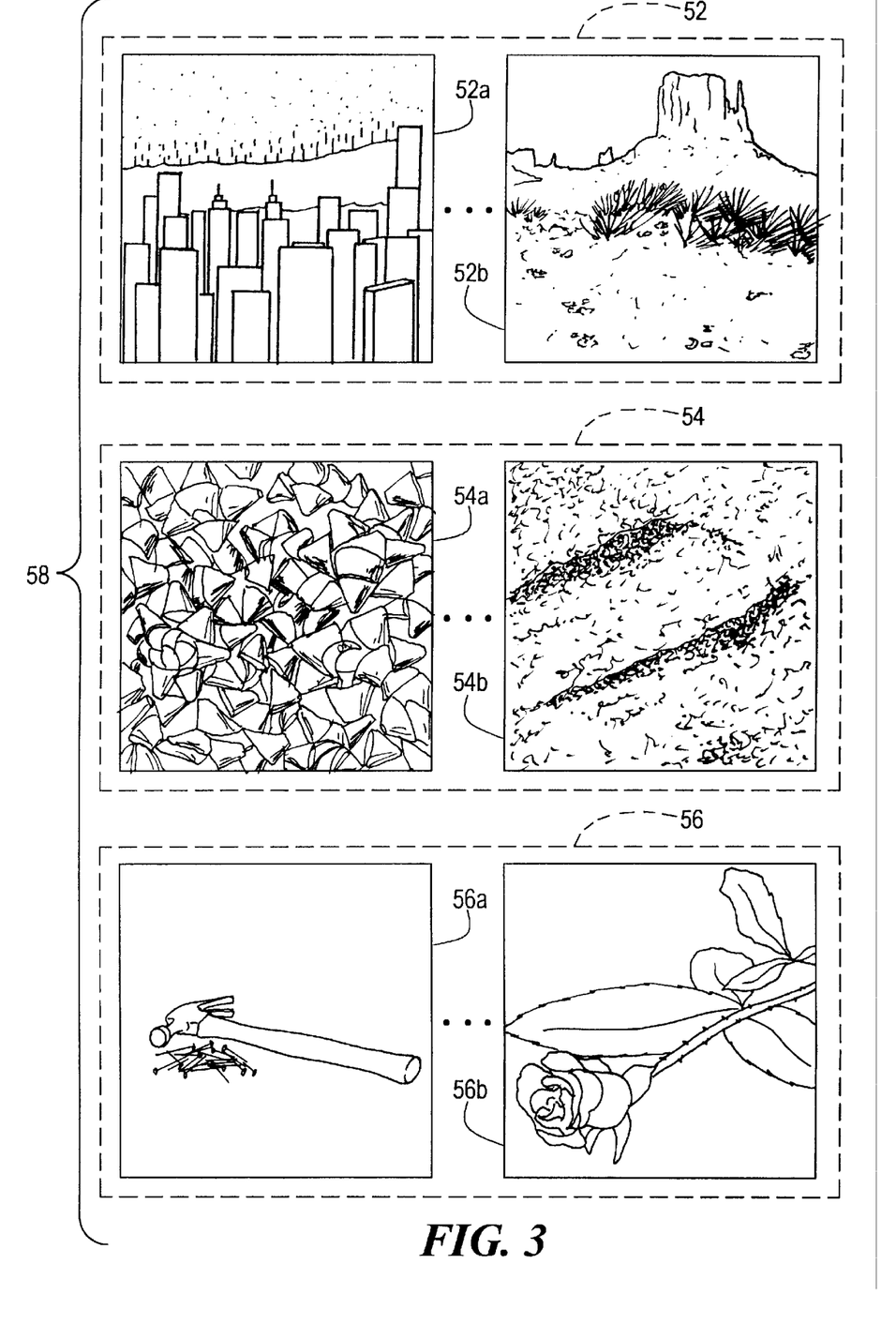
FIG. 3 is an exemplary sensory stimuli sequence presented to a user.

Referring briefly to FIG. 3, a plurality of images sets 52, 54, 56 provide an image sequence 58. Each of the image sets 52, 54, 56 include two or more images. For example, image set 52 includes cityscape image 52a and countryscape image 52b. Although in this particular example, image set 52 includes only a pair of images 52a, 52b, image set 52 may include more than two images. In a preferred embodiment, each of the images in the image set should provide a contrast in some respect with each of the other images in the set. It is also preferred that each of the images within the pair be presented with equal dignity. In this particular example, cityscape image 52a represents a busy, active scene while countryscape image 52b represents a relatively quiet, relaxed scene. A system user selects between the paired visual images 52a, 52b. By selecting one of the paired images 52a, 52b, the user reveals information related to the user's sense of aesthetics. It should be noted that the "dignity" is no real difference between the stimuli.

Image set 54 includes a ribbon image 54a and an image of a piece of marble 54b. The ribbon image represents a playful scene and the marble image 54b represents a stark scene. Similarly, image pair 56 includes a hammer and nail image 56a and a rose image 56b. The hammer and nail image 56a represents a practical sense while the rose image 56b represents a soft sense. Thus, each of the image sets 52, 54, 56 included in image sequence 58 includes contrasting image scenes. Selection of particular images from the image sequence 58 by a user thus reveals a sense of particular likes by the user. It has been found that such information can be useful in selecting people or items which may please the user. It should be appreciated that the particular images displayed to the user may be selected from a wide variety of different images and that the images included in a particular image set should be selected such that selection of one or another of the images reveals information about the user.

In this particular example three image sets 52, 54, 56 form image sequence 58. Those of ordinary skill in the art will appreciate of course that image sequence 58 may include any number of image sets and that the particular number of image sets to include in any particular image sequence may be selected in accordance with a variety of factors including but not limited to the number of image sets a system user is willing to view. Such a determination is typically made by empirically testing a particular image sequence. The number of image sets a user is willing to view is based, at least in part, upon the content of the images.

It should also be noted that the image sets may be placed in a predetermined order or in a random order to provide a particular image sequence. The above characteristics also hold true for sensory stimuli other than visual stimuli. For example, a sequence of sound pairs may be provided to the user.

Referring again to FIG. 2, each image set is displayed in sequence to a user. As shown in step 32, the user records an image selected from the image sets by the user. Decision block 34 and processing block 36 implement a loop such that the system displays to a user each of the image sets in an image sequence.

After the user selects an image from each of the image sets in the presented image sequence, processing proceeds to step 38 where the system generates a user data string. In addition to the user selected images, the user data string may also include other criteria from the user. For example, in the case where matching system is used to generate a match list for a user seeking to engage in activities or relationships with other people, the data string may include information such as the type of relationship the user is seeking (e.g. woman seeking man for relationship, man seeking man for sports or activity partner), the preference or non-preference of ethnicity, an age range of a prospective person, a geographical location within which a person must reside, and other particular attributes or characteristics of themselves or a person they seek to find (e.g. body type, smoking/non-smoking, drinking/non-drinking, education level, religious preference, etc.). Additionally, the user data string may include a user definable key word which may be used to further refine or act as a filter in the matching process.

After the user data string is generated, processing then proceeds to step 40 where the user data string is stored in a table and step 42 where the user data string is matched with a user data string already stored in the table. One particular matching technique which may be used will be described below in conjunction with FIGS. 4, 4A. It should be noted, however, that in some embodiments matching techniques other than those described in conjunction with FIGS. 4, 4A may be used. The particular matching technique should be selected to rapidly and accurately identify user data strings which indicate or locate users who have selected many or all of the same images as a selected system user.

Processing then flows to step 44 where the profile criteria, if any, entered by the user is applied to the user data strings matched in step 42. The profile criteria refers to portions or all of the above mentioned criteria which may be specified by user (e.g. type of relationship, ethnicity preference—if any, geographical location preferences—if any, etc. . . . ). It should be noted that a user may choose to not specify any criteria which can be used in step 44 to further narrow, limit or otherwise refine the user data strings identified in step 42.

Processing then flows to step 46 in which a match list for the user is generated. In this particular example, the match list would consist of names of appropriate persons who satisfy particular criteria specified by the user and who also selected a predetermined number of images from image sequence 58 which the user selected. Information related to that particular person may then be accessed by the user. In step 48, the user is given the option to select another path.

Figure 4:
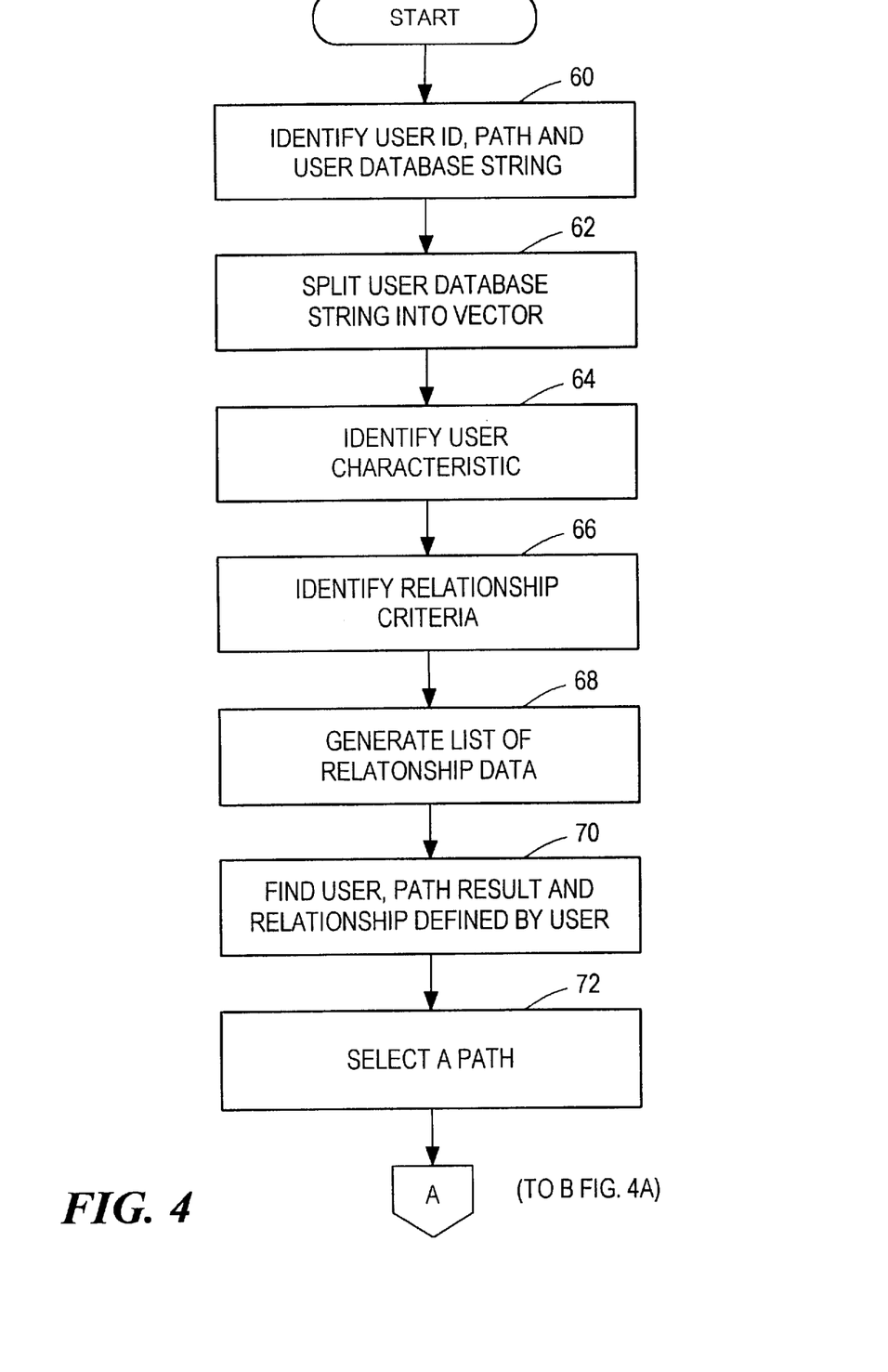
FIGS. 4 and 4A are a series of flow diagrams of a set of processing steps which takes place to match first and second users.
Figure 4A:
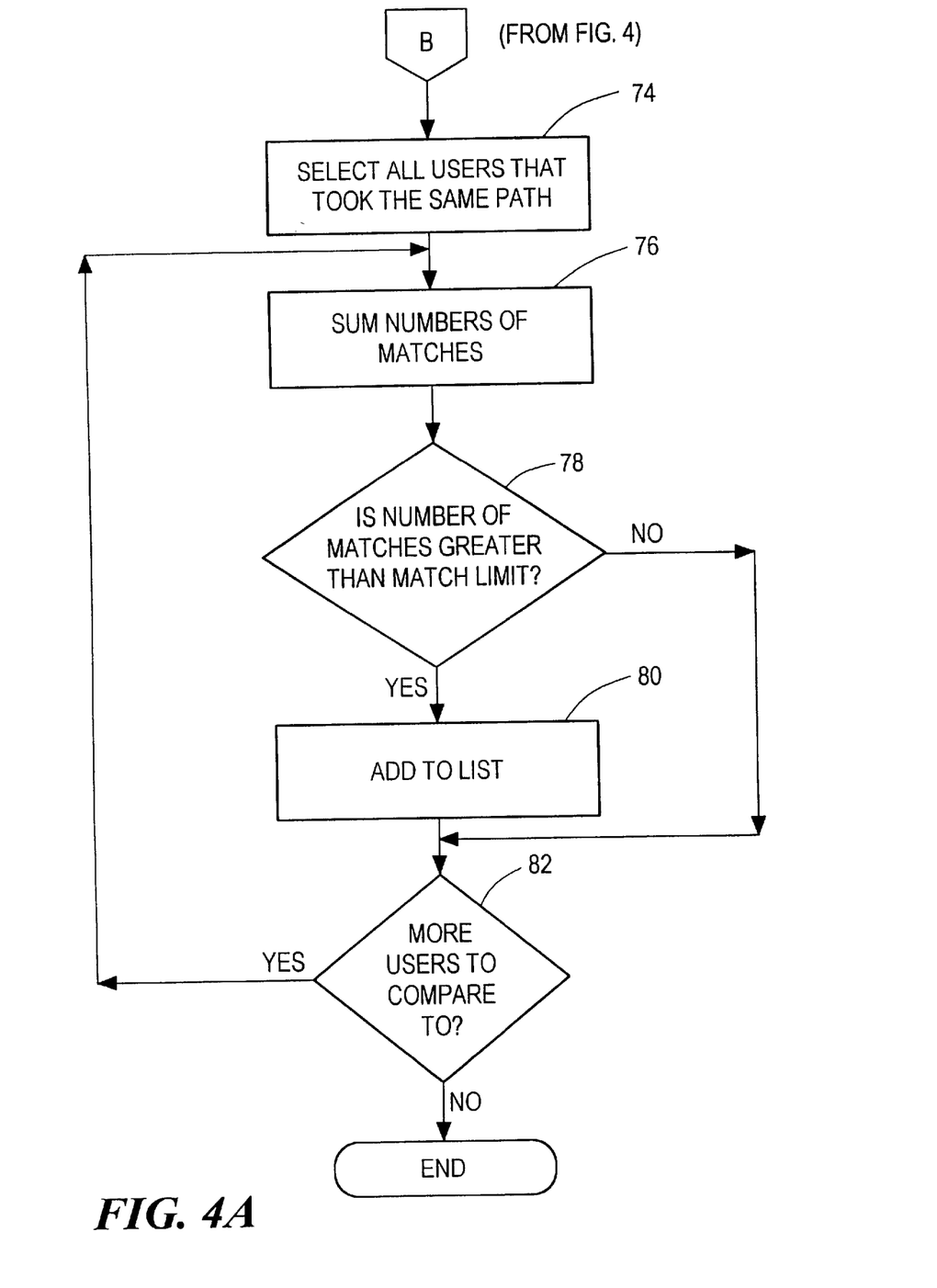

Referring now to FIGS. 4 and 4A, the processing used to generate a match list is shown. It should be noted that the process assumes that a plurality of user data strings are stored in a table or a database. Processing begins in step 60 where a particular user identification code, a particular path and a user data base string corresponding to the user identification code are identified. Processing then flows to step 62 where the user data string is separated into its component parts. Once the user data string is separated, processing proceeds to step 64 in which particular user characteristics are identified.

In step 66 a particular relationship criteria defined by the user is identified. For example, if the user specified that the type of relationship being sought is "man seeking man for sports or activity partner," then such information can be used to filter a match list by excluding, for example, any user who did not specify the same relationship type. It should be noted, however, that any profile criteria or user data can be utilized in the matching process. In step 68 a list of relationship data based upon the relationship criteria defined in step 66 is generated.

Next, in step 70, for a particular user, the image sequence viewed by the user (herein referred to as the "user's path" or simply the "path") and the particular images selected by the user in following the path (referred to herein as a "user path result") and the desired relationship specified by the user are identified. Having thus identified the particular path followed by a particular user, processing then flows to processing step 72 where a particular path out of a plurality of possible paths selected by the user is identified. Thus, in this manner the user data string of the particular user may be compared with the user data string of other users who have viewed the identical sequence of image sets as the selected user (i.e. the results of the image selection process of the selected user will be compared with the results of other users who have followed the same "path").

For example, one possible path may be referred to as an "art path" in which each of the images correspond to paintings which may be viewed when walking through an art museum. Thus an image set along this particular path may include an image of a painting by Pablo Picasso (i.e. an abstract painting) and an image of a painting by Winslow Homer (i.e. a representational painting). As a result of such an image sequence, the system generates a match list having the names of people who selected the same paintings. An example of a second different path which may be referred to as a "nature path" may include images, sounds or other stimuli typically found outdoors. The purpose of this path may be to aid in locating a person to be outdoors with.

Once the appropriate path is identified, processing then flows to step 74 where all users who selected the same image sequence (i.e. the same path) are identified. Such identification may be facilitated by placing the user data string for each path in a separate table. That is, a table of user data strings may exist for each path. Thus in the case where three paths exist, three tables of user data strings also exist. Alternatively, a single table having a field in which the path type is identified may also be used. Regardless of whether a single table or multiple tables are used, in some embodiments it may be preferable to store the user data strings in a table separate and apart from a table in which the user profile information may be stored.

Processing then flows to step 76 in which the choices of a particular user (i.e. the images selected in a particular path by a particular user) are compared with the choices of other users who followed the same path (i.e. other users who viewed and selected images from the same image sequence as the particular user). This comparison process is referred to herein as matching. As explained above, the choices for each of the users have been recorded as user data strings. The data strings are preferably selected to fit within a database field. Thus, the matching may be accomplished by comparing the database fields for each user.

When comparing user data strings in this manner, a summation is performed summing the number of database fields which have the identical entry. Thus a sum of the number of like images selected by two users is computed. When the user data strings are stored in a commercial database system, the matching procedure may be implemented as a process in the database thus increasing the speed with the matching process may be performed and the speed with which results may be presented to a user.

Processing then flows to decision block 78 where it is determined if the number of images selected by the two uses exceeds a predetermined match limit value. The match limit value may be selected to ensure that the user path results for two users must be nearly identical if the users are said to match. The match limit value may selected, for example, to require that out of eight total images two users must select seven of the same images (i.e. seven database fields for the two user data strings must be identical). If the number of matches is greater than the predetermined match limit value, then processing flows to step 80 where a user identifier or name is generated and added to a match list.

If the number of matches is not greater than the match limit value, then processing flows to decision block 82 where a decision is made as to whether more users are available for comparison. If in decision block 82 more users are available for comparison, then processing flows back to steps 76–80 until all users who have followed the same path have been compared. Once all users have been compared, then processing ends.

Figure 5:
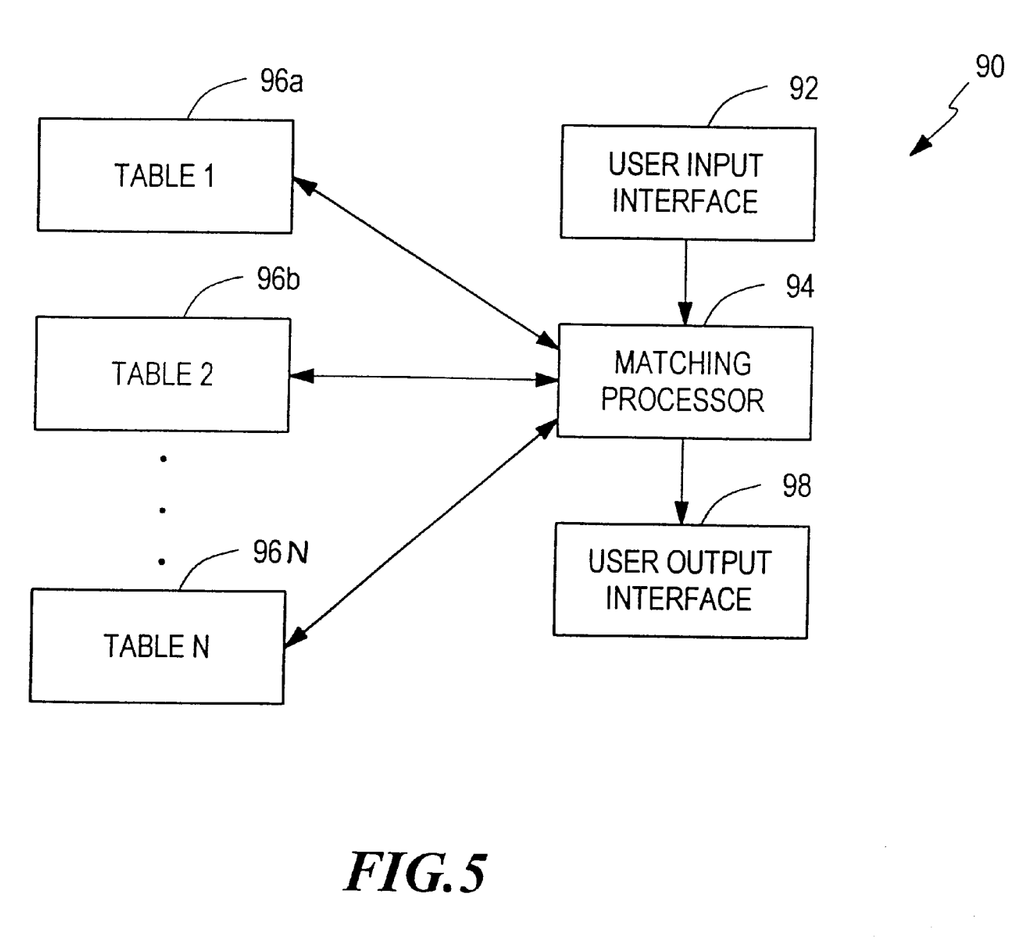
FIG. 5 is a block diagram of a matching system.

Referring now to FIG. 5, a matching system 90 includes a user input interface 92 coupled to a matching processor 94. User input interface 92 may be provided, for example, as a graphical user interface (GUI) and matching processor 94 may be provided as any type of processing apparatus which is programmable to implement steps similar to those described above in conjunction with FIGS. 2, 2A, 4, 4A above required in a matching process.

Matching processor 94 is coupled to a plurality of tables 96a–96N generally denoted 96. Each of the tables include information from a particular path. That is, each user may select one of a plurality of paths and identify sensory stimuli presented thereto in each of the paths. The user selection for each of the paths is stored in a particular table. For example, table 96a may include user information for user responses along a first path, table 96b may include user information for user responses along a second path and table 96n may include user information for user responses along an Nth path. Thus, if the same user follows three different paths, the user may have a user data string in each of three tables 96. In the case where a user has entries in multiple tables, in some embodiments matching processor 94 may utilize the user data string in each of the tables. Matching processor 94 is also coupled to a user output interface 98 which displays to a user a predetermined match list provided by matching processor 94.

Figure 6:
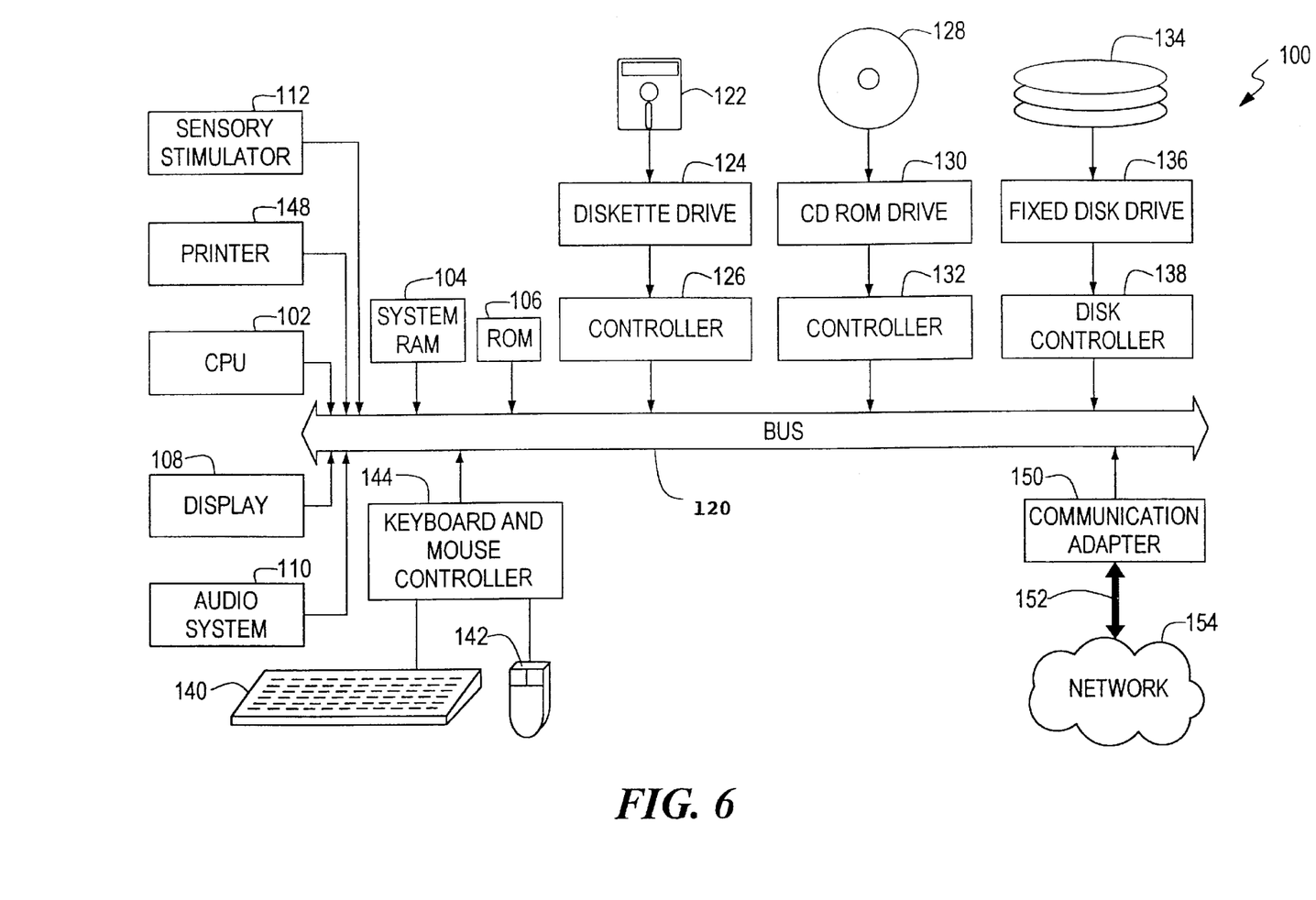
FIG. 6 is a block diagram of a computer system adapted for use with the present invention.

Referring now to FIG. 6, a computer system 100 on which the invention may be implemented is shown. Computer system 100 may be provided, for example, as an IBM compatible computer or any other equivalent computer system. The exemplary computer system 100 of FIG. 6 is for descriptive purposes only. Although the description may refer to terms commonly used in describing particular computer systems, the description and concepts equally apply to other processing systems, including systems having architectures dissimilar to that shown in FIG. 6.

Computer system 100 includes a central processing unit (CPU) 102, which may be provided, for example, as a conventional microprocessor, a random access memory (RAM) 104 for temporary storage of information, and a read only memory (ROM) 106 for permanent storage of information. Computer system 100 also includes a display 108, an audio system 110 and a sensory stimulator 112. Each of the aforementioned components are coupled to a bus 120. Operation of computer system 100 is generally controlled and coordinated by operating system software. The operating system controls allocation of system resources and performs tasks such as processing, scheduling, memory management, networking, and I/O services, among things. Thus, an operating system resident in system memory and executed by CPU 102 coordinates the operation of the other elements of computer system 100.

Also coupled to bus 120 is a non-volatile mass storage device which may be provided as a diskette 122. Diskette 122 is insertable into a diskette drive 124 which is, in turn, coupled to bus 120 by a controller 126. Similarly, a compact disc (CD) ROM 128 is insertable into a CD ROM drive 130 which is, in turn, coupled to bus 120 by a controller 132. A hard disk 134 is typically provided as part of a fixed disk drive 136 which is coupled to bus 120 by a disk controller 138.

Data and software may be provided to and extracted from computer system 100 via removable storage media such as diskette 122 and CD ROM 128. For example, data values generated using techniques to be described below in conjunction with FIGS. 2–5 may be stored on storage media similar to media 122, 128. The data values may then be retrieved from the media 122, 128 by CPU 102 and utilized by CPU 102 to perform color printing of scanned or stored mixed color documents. Alternatively, CPU 102 may simply store such data values in ROM 106.

Alternatively still, computer software useful for matching may be stored on storage media similar to media 122, 128. Such computer software may be retrieved from media 122, 128 for immediate execution by CPU 102 or by other processors included in one or more peripherals of computer system 100 such as display 108, audio system 110 or sensory stimulator 112. CPU 102 may retrieve the computer software and subsequently store the software in RAM 104 or ROM 106 for later execution.

User input to computer system 100 may be provided by a number of devices. For example, a keyboard 140 and a mouse 142 are coupled to bus 120 by a controller 144. Sensory stimulator 112 may also function as an input device and may be provided, for example, as a hand held sensor/vibration mechanism coupled to bus 120.

Computer system 100 also includes a communications adaptor 150 which allows the system to be interconnected to a local area network (LAN) or a wide area network (WAN), schematically illustrated by bus 152 and network 154. Thus, data and computer program software can be transferred to and from computer system 100 via adapter 150, bus 152 and network 154.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system for matching users of a computer system comprising:

(a) means for providing a plurality of sensory stimulus sets to a first user, each of the plurality of sensory stimulus sets including a plurality of subjective, contrasting stimuli;

(b) means, responsive to the first user selecting a sensory stimulus from each of the plurality of sensory stimuli sets, for storing an identifier which identifies the sensory stimuli selected by the first user;

(c) means for generating a user data string including an identifier for each of the sensory stimuli selected by the first user in each of the plurality of sensory stimulus sets;

(d) means for comparing the data string for the first user with data strings of others user to provide respective match values by counting common sensory stimuli selections of the first user and the other users;

(e) means for comparing the match values to a predetermined threshold value corresponding to a number of common sensory stimuli selections for determining whether the first user and the other users have similar subjective tastes; and (f) means for providing a match list to the first user based on the match value comparisons.

2. The system of claim 1 further comprising:

means for storing each user data string in a table;

means for selecting one user data string;

means for matching the selected user data string with another user data string already stored in the table;

means for applying profile criteria to the user data strings; and means for generating a list of matches.

3. The system of claim 2 further comprising:

means for selecting a first path from a plurality of paths; and means for selecting all users who followed the selected path.

4. The method of claim 1 wherein the threshold value is adaptive based on a history of people taking paths or user characteristics.

5. The system of claim 4 wherein said means for providing a sensory stimulus to a user comprises:

a display to display images to a user; and a speaker for providing audio signals to a user.

6. A method of matching users of a computer system, the method comprising the steps of:

(a) displaying a first image set to a first user, the first image set including a plurality of subjective, contrasting images;

(b) in response to the first user selecting one image from the plurality of images, storing an identifier which identifies the image selected by the first user;

(c) repeating steps (a) and (b) for a plurality of image sets;
(d) generating a first user data string which includes an identifier for each of the images selected by the first user in each of the plurality of images sets;
(e) storing the user data string in a table;
(f) displaying the first image set to a second user;
(g) in response to the second user selecting one image from the plurality of images, storing an identifier which identifies the image selected by the second user;
(h) repeating steps (f) and (g) for a plurality of image sets;
(i) generating a second user data string which includes an identifier for each of the images selected by the second user in each of the plurality of images sets;
(j) storing the second user data string in a table;
(k) selecting one of the first and second user data strings;
(l) matching the selected user data string with another user data string already stored in the table;
(m) applying profile criteria to the user data strings; and
(n) generating a list of matches identifying other users having tastes similar to the first user and providing the list of matches to the selected user.

7. The method of claim 6 wherein at least one of the image sets includes more than two images.

8. The method of claim 7 wherein the step of matching the selected user data string with another user data string already stored in the table comprises the step of:
(o) selecting a path;
(p) selecting all users who followed the selected path;
(q) for each of a plurality of users who followed the selected path performing the steps of:
 (1) selecting a user from the plurality of users;
 (2) counting the number of user path results selected by both the selected user and another user to provide a match value;
 (3) comparing the match value to a predetermined threshold value; and
 (4) in response to the match value being greater than the threshold value, adding the other user to a list of users possibly compatible to the first user.

9. The method of claim 8 further comprising the step of repeating steps (q2)–(q3) for each of the plurality of users who followed the selected path and who are not the selected user.

10. The method of claim 8 wherein prior to step (n), the method further comprises the steps of:
obtaining profile criteria data from the first user;
comparing the first user profile criteria data to characteristic data of other user; and
determining other users that meet a predetermined number of the first user's profile criteria.

11. A method of matching users of a computer system, the method comprising the steps of:
(a) providing a first sensory stimulus set to a first user, the first sensory stimulus set including a plurality of subjective, contrasting stimuli;
(b) in response to the first user selecting one sensory stimulus from the plurality of sensory stimuli, storing an identifier which identifies the sensory stimuli selected by the first user;
(c) repeating steps (a) and (b) for a plurality of sensory stimulus sets;
(d) generating a first user data string which includes an identifier for each of the sensory stimuli selected by the first user in each of the plurality of sensory stimulus sets;
(e) storing the user data string in a table;
(f) displaying the first sensory stimulus set to further users;
(g) in response to the further users selecting sensory stimulus from the plurality of sensory stimuli, storing identifiers which identify the sensory stimulus selected by the further users;
(h) repeating steps (f) and (g) for a plurality of sensory stimulus sets;
(i) generating further user data strings which include identifiers for each of the sensory stimuli selected by the further users in each of the plurality of sensory stimulus sets;
(j) storing the further user data strings in a table;
(k) selecting one of the further user data strings;
(l) matching the selected user data string with the first user data string in the table;
(m) applying profile criteria to the first user data string and the selected user data string;
(n) comparing the first user data string with the selected user data string;
(o) repeating steps (k)–(n);
(p) generating a list of matches based upon the comparison of the data strings for identifying other uses that have similar tastes as the first user; and
(q) providing the list of matches to the first user.

12. The method of claim 11 wherein the step of matching the selected user data string with further user data strings already stored in the table comprises the step of:
(r) selecting a path;
(s) selecting all users who followed the selected path;
(t) for each of a plurality of users who followed the selected path performing the steps of:
 (1) selecting a user from the plurality of users;
 (2) counting the number of sensory stimuli selected by both the selected user and another user to provide a match value;
 (3) comparing the match value to a predetermined threshold value; and
 (4) in response to the match value being greater than the threshold value, adding the other user to a list of users possibly compatible to the first user.

13. The method of claim 12 further comprising the step of repeating steps (t2)–(t3) for each of the plurality of users who followed the selected path and who are not the selected user.

14. A computer program product comprising a computer useable medium having computer readable program code for implementing a method of matching users of a system, the method comprising:
(a) providing a first sensory stimulus set to a first user, the first sensory stimulus set including a plurality of subjective stimuli;
(b) in response to the first user selecting one sensory stimulus from the plurality of sensory stimuli, storing an identifier which identifies the sensory stimuli selected by the first user;
(c) repeating steps (a) and (b) for a plurality of sensory stimulus sets;
(d) generating a first user data string which includes an identifier for each of the sensory stimuli selected by the first user in each of the plurality of sensory stimulus sets;
(e) storing the user data string in a table (f) displaying the first sensory stimulus set to further users;

(g) in response to the further users selecting sensory stimulus from the plurality of sensory stimuli, storing identifiers which identify the sensory stimulus selected by the further users;

(h) repeating steps (f) and (g) for a plurality of sensory stimulus sets;

(i) generating further user data strings which include identifiers for each of the sensory stimuli selected by the further users in each of the plurality of sensory stimulus sets;

(j) storing the further user data strings in a table;

(k) selecting one of the further user data strings;

(l) matching the selected user data string with the first user data string in the table for determining users having similar subjective tastes;

(m) applying profile criteria to the first user data string and the selected user data string;

(n) comparing the first user data string with the selected user data string;

(o) repeating steps (k)–(n);

(p) generating a list of matches based upon the comparison of the data strings; and (q) providing the list of matches to the first user.

15. The computer program product of claim 14 wherein the step of matching the selected user data string with the first user data string comprises:

selecting a path; and selecting users who followed the selected path.

16. The computer program product of claim 15 wherein the method further includes counting the number of sensory stimuli selected by both the selected user and the first user to provide a match value; and comparing the match value to a predetermined threshold value.

* * * * *